R. T. HOSKING.
NUT LOCK.
APPLICATION FILED OCT. 11, 1918.

1,419,564.

Patented June 13, 1922.

Richard T. Hosking INVENTOR

BY

Geo. B. Willcox ATTORNEY

UNITED STATES PATENT OFFICE.

RICHARD T. HOSKING, OF SAGINAW, MICHIGAN, ASSIGNOR TO SHAKEPROOF SCREW & NUT LOCK COMPANY, OF CHICAGO, ILLINOIS, A CORPORATION OF ILLINOIS.

NUT LOCK.

1,419,564.      Specification of Letters Patent.     Patented June 13, 1922.

Application filed October 11, 1918. Serial No. 257,795.

*To all whom it may concern:*

Be it known that I, RICHARD T. HOSKING, a citizen of the United States, residing at Saginaw, in the county of Saginaw and State of Michigan, have invented certain new and useful Improvements in Nut Locks; and I do hereby declare the following to be a full, clear, and exact description of the invention, such as will enable others skilled in the art to which it appertains to make and use the same.

This invention is a nut lock. The improvement consists in a device adapted to lock and securely hold a nut when tightened against a surface, such as a plate or part of a machine frame.

The object of the improvement is to provide a nut lock in the form of a sheet metal washer that can be manufactured at small expense and which is adapted to grip the face of the nut to hold it against turning, the effectiveness of the grip automatically increasing if the nut is subjected to jar or vibration, as in machinery that is operating.

A further purpose of the invention is to provide a nut lock of the washer type having locking prongs and projections adapted to become engaged between the work and the face of the nut in such manner that when the nut is turned in the reverse direction, as in unscrewing, the prongs or projections on the locking device will be required to turn or roll slightly and to thereby exert an increasing gripping effect, after the manner of a lever or toggle joint, as distinguished from a mere scraping or planing action such as would be produced by a non-rolling toothed projection.

My invention is illustrated in the accompanying drawings, in which Fig. 1 is a side view of two plates secured together by means of a bolt and nut with my improved lock interposed between the face of the nut and the face of one of the plates.

Figure 3:
Fig. 3 is a fragmentary edge view of a washer showing the twist of the teeth.

As is clearly shown in the drawings, the device consists in a washer body 1, preferably made of sheet metal and formed with a bolt opening 2, the periphery of the washer body provided with projecting prongs or teeth 3. These teeth are preferably of substantially uniform width throughout their length and are slightly twisted as indicated in Figs. 1 and 3, so that their outer extremities do not lie entirely in the plane of the body 1, but are disposed diagonally with respect to that plane, the upper corner of the end of the tooth lying somewhat above the upper face of the body 1 and the diagonally opposite lower corner being somewhat below the lower face of the body, as illustrated in Fig. 1 and Figs. 3 and 4.

When the nut 4 is tightened on the bolt 5, the ends of the teeth 3 are squeezed between the plate 6 and the face of the nut, and the teeth are untwisted or sprung back accordingly. When the tightened nut or bolt is subjected to vibration, as occurs on moving machinery, the diagonally opposite upper and lower corners of the extremities of the teeth grip into and become slightly embedded in the faces of the nut and plate, as shown in Fig. 4.

Figure 4:
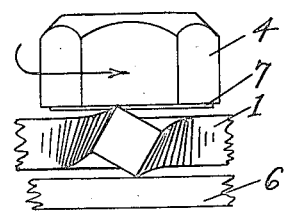
Fig. 4 is a side view of a nut and parts of a plate and a locking washer, the end view of a tooth being shown.

When the nut is unscrewed, as in the direction of the arrow in Fig. 4, the outer or free ends of the teeth are obliged to roll slightly and thereby act after the manner of an inclined strut, the action being similar to that of one member of a toggle joint, thereby gripping the nut more tightly and locking it firmly in position until it is desired to unscrew the nut, in which event sufficient force is applied to the nut to actually buckle or break the tooth 3. When the outer or free end of the tooth rolls as above described, the body or intermediate part of the tooth between the point and the root is bodily warped or twisted as shown in Fig. 4.

Figure 1:
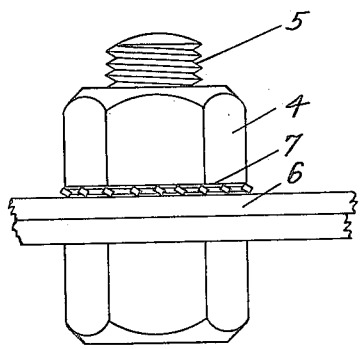
Figure 2:
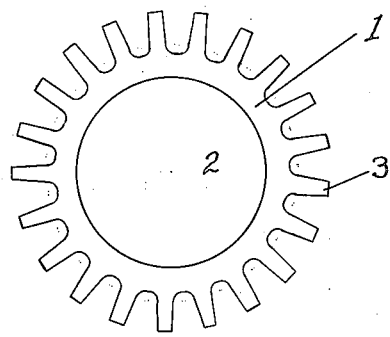
Fig. 2 is an enlarged plan view of a washer embodying my improvement.

The washer and the teeth are preferably made of resilient material, such as tempered spring steel, and are given sufficient initial twist to enable them to engage the surface of the nut near the extremities of its long diameter, this part of the nut being usually slightly offset with respect to the body of the nut, as indicated at 7, in Figs. 1 and 4.

The function of the resilient teeth is important, for by reason of its resilience or flexibility each tooth is made capable of rolling or turning about its longitudinal axis and therefore performs the locking function which depends, as above stated, upon its capability of rolling slightly and thereby presenting its long diameter or diagonal dimension as an inclined strut between the nut and the work.

It is customary to form machine nuts with this offset 7, but when nuts without this offset are employed, the teeth 3 of the washer will operate equally well.

The tooth being of substantially the same thickness as width near its outer end, can actually roll when the nut is unscrewed and by so rolling twists the body of the tooth axially between its point and root and in so twisting causes the diagonal dimension of the tooth to be jammed as a strut between the work and the nut, and acting as a prop or wedge tending to force the nut and the work bodily apart, thereby to lock the nut tightly upon the thread of its bolt, or to lock a bolt head, if the improvement be applied to a bolt instead of to a nut.

The device is simple in construction, inexpensive to manufacture and can be readily used by persons not possessed of mechanical skill. It may be used with any form of flat faced nut, or screw or bolt head.

I claim,

1. A nut lock comprising a washer having radially projecting teeth of thin spring material, each tooth of suitable cross-sectional shape to adapt it to rolling movement between the faces of the work and nut when the nut turns in reverse direction, said tooth when so rolled presenting its long diameter between said faces whereby to exert thrust tending to force said work and the nut apart and to thereby lock them against further relative rotation.

2. A nut lock comprising a washer of thin spring material, a plurality of radially projecting teeth formed integral with said washer, said teeth spaced apart circumferentially, the width of each tooth near its point being substantially equal to the thickness of the washer, each of said teeth slightly twisted at its outer end with respect to the plane of the body of said washer, the free end of said tooth adapted to be axially rolled by the nut when the nut is turned in reverse direction and in rolling to further twist the body of the tooth intermediate its point and root, whereby to present the diagonal dimension of the outer part of said tooth to the nut and work respectively, to cause the diagonal to operate as a strut between the nut and work, said strut tending to force the nut and work apart and to thereby lock them against further relative rotation.

In testimony whereof, I affix my signature.

RICHARD T. HOSKING.